UNITED STATES PATENT OFFICE.

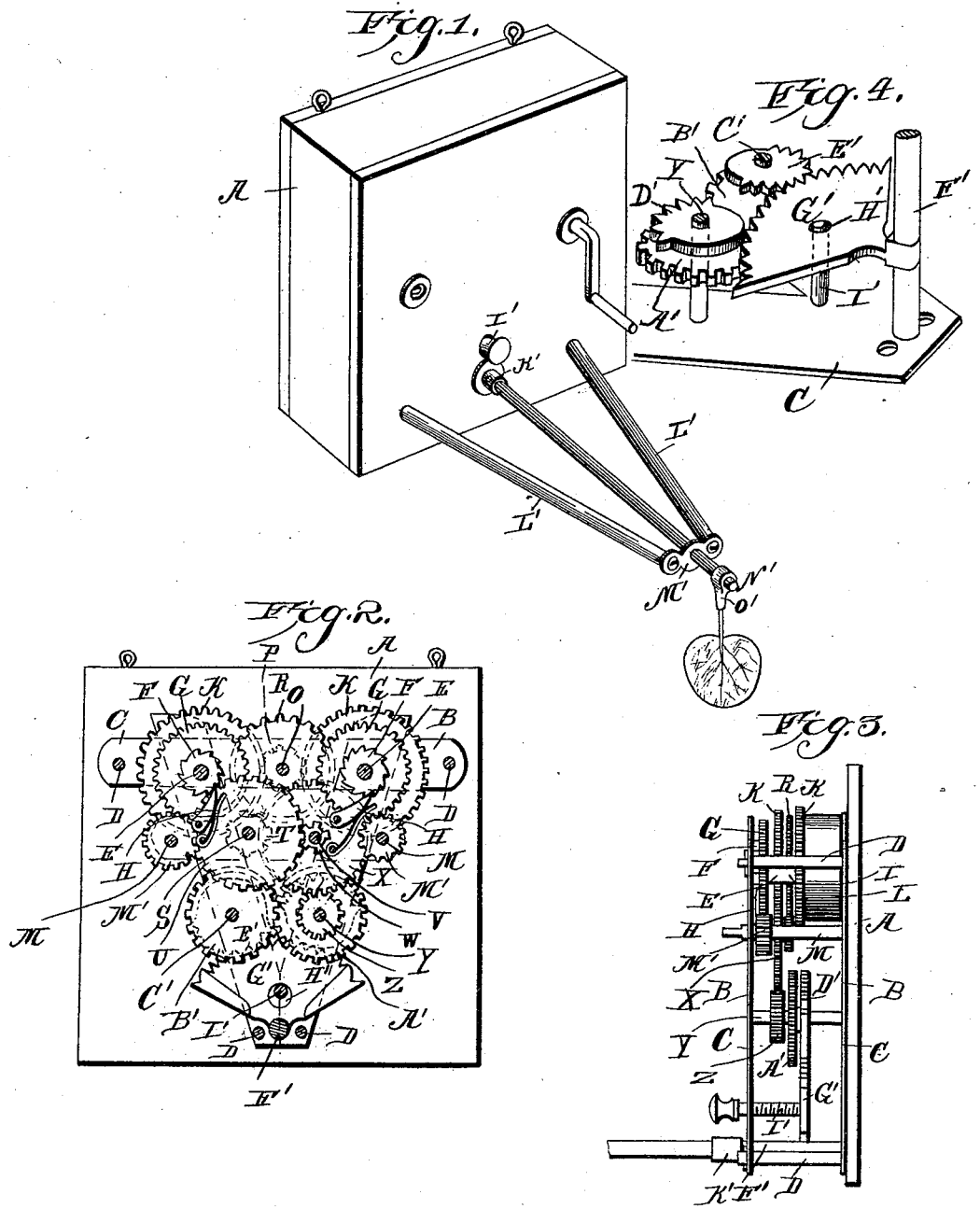

ERNST THEODOR HEINSOHN AND JOHN HOFFMANN, OF FRELSBURG, TEXAS.

MOTOR.

SPECIFICATION forming part of Letters Patent No. 397,288, dated February 5, 1889.

Application filed August 23, 1888. Serial No. 283,515. (No model.)

*To all whom it may concern:*

Be it known that we, ERNST THEODOR HEINSOHN, and JOHN HOFFMANN, citizens of the United States, residing at Frelsburg, in the county of Colorado and State of Texas, have invented a new and useful Improvement in Motors, of which the following is a specification.

Our invention relates to an improvement in fan-motors; and it consists in the peculiar construction and combination of devices that will be more fully set forth hereinafter, and particularly pointed out in the claim.

In the accompanying drawings, Figure 1 is a perspective view of a fan-motor embodying our improvements. Fig. 2 is an elevation, partly in section, of the operating-gearing. Fig. 3 is a side elevation of the same. Fig. 4 is a detailed perspective view.

A represents an inclosing-case, which is preferably rectangular, as shown in Fig. 1, but may be made in any other suitable shape, if desired.

B represents a V-shaped frame, which is secured in the case and comprises the sides C and the posts D, which connect the same at their corners.

Journaled in the upper side of the frame B, near the upper corners thereof, are a pair of shafts, E, to which are secured ratchet-wheels F and spur-wheels G. The ratchet-wheels are engaged by spring-actuated pawls H, that are pivoted to the frame, and thereby the shafts are prevented from rotating, save in one direction.

Loosely journaled on the shafts E are sleeves I, to which are rigidly secured spur-wheels K. L represents volute springs, which have their inner ends secured to the shafts E and their outer ends secured to the wheel K. At a suitable distance below the shaft E are journaled winding-shafts M, which are provided with pinions M', that engage the spur-wheels G. The outer ends of the said shafts project through openings in the front side of the case, and are squared or made angular in cross-section and adapted to be engaged by a key, whereby said shafts may be rotated, so as to wind up the springs.

O represents a shaft, which is journaled in the frame midway between the shafts E, and is provided with a pinion, P, which is engaged by the wheels K, and is further provided with a spur-wheel, R.

S represents a shaft, which is journaled in the frame, and is provided with a pinion, T, that engages the wheel R, and is further provided with a spur-wheel, U. A shaft, V, is journaled in the frame in the same plane with and at a suitable distance from the shaft S, and is provided with a pinion, W, that engages the wheel U, and has a spur-wheel, X.

Y represents a shaft, which is journaled in the frame at a suitable distance below the shaft V. To this shaft Y is rigidly secured a pinion, Z, which engages the wheel X, and is further provided with a wheel, A', which engages a similar wheel, B', of the same size and rigidly secured to a counter-shaft, C'. To the said shafts Y and C', which, being geared together, are caused to rotate in opposite directions, as will be readily understood, are secured spur-sectors D' and E', respectively, each of which is provided with teeth around half its circumference, and the said teeth being on diametrically-opposite sides of the said pairs of sectors, as shown in Fig. 2.

F' represents a rock-shaft, which is journaled at the lower corner of the frame. Rigidly secured to this rock-shaft is a spur sector or arm, G', which is adapted to engage the sectors D' and E' alternately when the latter are in rotation, and inasmuch as the said sectors rotate in opposite directions the same, by alternately engaging the sector G', causes the latter to operate and impart rocking motion to the shaft F'. The train of gears hereinbefore described transmit the rotary motion of the driving-shaft E to the shafts Y and C'. In the center of the sector G' is an opening, H'.

I' represents a stop pin or screw, which works in a threaded opening in the front side of the frame, has its head projecting through an opening in the front side of the case, and is adapted to engage the opening H', so as to lock the sector G', and thereby prevent the motor from operating.

The front end of the rock-shaft F' projects through a central opening in the front side of the case, near the lower end thereof, and is provided with a socket, K'.

L' represents a pair of supporting-rods, which project from the front side of the case, are arranged in the same horizontal plane, converge toward each other, and have their outer ends connected by the plate or yoke M'. The latter forms the bearing for a rocking fan-shaft, N', the inner end of which is secured in the socket K'. From the outer end of the fan-shaft depends an arm, O', to which a suitable fan may be attached.

It will be understood that the rocking motion of the shaft F' is imparted to the fan-shaft, and that the latter tends to operate the fan.

A motor thus constructed may be also employed for operating various kinds of light machines; and we do not therefore wish to limit ourselves to its use in connection with a fan.

Having thus described our invention, we claim—

In a fan-motor, the V-shaped frame B, the shafts E, journaled in the upper corners thereof, the ratchet-wheels F and spur-wheels G, secured to said shafts; the spring-actuated pawls pivoted to the frame and engaging the ratchet-wheels, sleeves loose on shafts E, and having the spur-wheels K fast to said sleeves, the volute springs L, with their inner ends fast to shafts E and their outer ends fast to wheels K, the winding-shafts M, having the pinions M', engaging wheels G, the shaft O between shafts E, having the pinion P, engaging wheels K, and provided further with the spur-wheel R, the shaft S, having pinion T, engaging wheel R, and provided with the spur-wheel U, the shaft V, having the pinion W and spur-wheel X, the former engaging wheel U, the shaft Y, having the pinion Z, engaging wheel X, and provided also with the wheel A', the counter-shaft C', having wheel B', of the same size as wheel A' and engaging the latter, the spurred sectors D' E', secured to said shafts Y C', the rock-shaft having the spurred sector G', provided with opening H' and engaging sectors D' E' alternately, the screw I, engaging the frame and adapted to engage the opening H', for the purpose set forth, and the fan-shaft detachably secured to the rock-shaft, all in combination, substantially as described.

In testimony that we claim the foregoing as our own we have hereto affixed our signatures in presence of two witnesses.

ERNST THEODOR HEINSOHN.
JOHN HOFFMANN.

Witnesses:
C. T. ZAPP,
WM. MUENZLER.